United States Patent
Cao et al.

(10) Patent No.: US 11,551,438 B2
(45) Date of Patent: Jan. 10, 2023

(54) IMAGE ANALYSIS METHOD AND RELATED DEVICE

(71) Applicant: Shenzhen Intellifusion Technologies Co., Ltd., Guangdong (CN)

(72) Inventors: Qingxin Cao, Guangdong (CN); Wei Li, Guangdong (CN)

(73) Assignee: Shenzhen Intellifusion Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/623,605

(22) PCT Filed: Aug. 14, 2020

(86) PCT No.: PCT/CN2020/109062
§ 371 (c)(1),
(2) Date: Dec. 29, 2021

(87) PCT Pub. No.: WO2021/139156
PCT Pub. Date: Jul. 15, 2021

(65) Prior Publication Data
US 2022/0215655 A1    Jul. 7, 2022

(30) Foreign Application Priority Data

Jan. 7, 2020 (CN) .......................... 202010015744.6

(51) Int. Cl.
*G06V 10/82*  (2022.01)
*G06V 40/16*  (2022.01)
(Continued)

(52) U.S. Cl.
CPC ............. *G06V 10/82* (2022.01); *G06N 3/063* (2013.01); *G06N 3/08* (2013.01); *G06V 20/625* (2022.01); *G06V 40/168* (2022.01); *G06V 40/172* (2022.01)

(58) Field of Classification Search
CPC .... G06V 10/82; G06V 20/625; G06V 40/168; G06V 40/172; G06N 3/063; G06N 3/08
See application file for complete search history.

(56) References Cited

U.S. PATENT DOCUMENTS 10,860,879 B2 *  12/2020  Giering ................. G06T 7/0004
11,176,403 B1 *  11/2021  Singh ..................... G06V 10/82
(Continued)

FOREIGN PATENT DOCUMENTS

CN          110580522 A      12/2019

OTHER PUBLICATIONS

Cao, Q., et al., "Convolution calculation method and related equipment", English translation of Chinese patent publication CN110580522A, published Dec. 17, 2019.*

*Primary Examiner* — Xuemei G Chen

(57) ABSTRACT

An image analysis method and a related device are provided. The method includes: obtaining an input matrix of a network layer A, the input matrix of the network layer A obtained based on a target type image; obtaining a target convolution kernel and a target convolution step length corresponding to the network layer A, different network layers corresponding to different convolution step lengths; performing convolution calculation on the input matrix and the target convolution kernel according to the target convolution step length to obtain an output matrix of the network layer A, the output matrix used for representing a plurality of features included in the target type image; determining a target preset operation corresponding to the target type image according to a pre-stored mapping relationship between a type image and a preset operation; and performing the target preset operation according to the plurality of features comprised included in the target type image.

6 Claims, 7 Drawing Sheets

(51) Int. Cl.
  *G06V 20/62*   (2022.01)
  *G06N 3/063*   (2006.01)
  *G06N 3/08*    (2006.01)

(56) References Cited

U.S. PATENT DOCUMENTS

| | | | |
|---|---|---|---|
| 2018/0152361 A1* | 5/2018 | Chu | H04L 67/02 |
| 2021/0056315 A1* | 2/2021 | Kale | G06N 3/08 |
| 2021/0200993 A1* | 7/2021 | Chen | G06N 3/08 |
| 2021/0279603 A1* | 9/2021 | Teran Matus | G06N 5/04 |
| 2021/0303911 A1* | 9/2021 | Li | G06V 20/58 |
| 2022/0051074 A1* | 2/2022 | Lin | G06N 3/04 |

* cited by examiner

First row of output data of the output matrix of the network layer A | 2 | 4 | 3 |

First row of output data of the output matrix of the network layer A | 5 | 7 | 8 |

First row of output data of the output matrix of the network layer A | 9 | 1 | 6 |

A bias value is 1

Output matrix of the network layer A

| 3 | 5 | 4 |
| 6 | 8 | 9 |
| 10 | 2 | 7 |

FIG. 2F

First row of input data: 14 13 12 11 10 9 8 7 6 5 4 3 2 1 0
Second row of input data: 30 29 28 27 26 25 24 23 22 21 20 19 18 17 16
Third row of input data: 46 45 44 43 42 41 40 39 38 37 36 35 34 33 32

R4=13
S3=2

13 11 9 7 5 3 1
12 10 8 6 4 2 0    → Three sub-input data of a first row
14 12 10 8 6 4 2

29 27 25 23 21 19 17
28 26 24 22 20 18 16   → Three sub-input data of a second row
30 28 26 24 22 20 18

45 43 41 39 37 35 33
44 42 40 38 36 34 32   → Three sub-input data of a third row
46 44 42 40 38 36 34

FIG. 2G

Input data from the first row to the third row of the input matrix of the network layer A | Target convolution kernel

| 14 | 13 | 12 | 11 | 10 | 9 | 8 | 7 | 6 | 5 | 4 | 3 | 2 | 1 | 0 |
|----|----|----|----|----|---|---|---|---|---|---|---|---|---|---|
| 30 | 29 | 28 | 27 | 26 | 25 | 24 | 23 | 22 | 21 | 20 | 19 | 18 | 17 | 16 |
| 46 | 45 | 44 | 43 | 42 | 41 | 40 | 39 | 38 | 37 | 36 | 35 | 34 | 33 | 32 |

| c | b | a |
|---|---|---|
| f | e | d |
| i | h | g |

C1  b × | 13 | 11 | 9 | 7 | 5 | 3 | 1 |
          +  +  +  +  +  +  +

C2  a × | 12 | 10 | 8 | 6 | 4 | 2 | 0 |
          +  +  +  +  +  +  +

C3  c × | 14 | 12 | 10 | 8 | 6 | 4 | 2 |
          +  +  +  +  +  +  +

C4  e × | 29 | 27 | 25 | 23 | 21 | 19 | 17 |
          +  +  +  +  +  +  +

C5  d × | 28 | 26 | 24 | 22 | 20 | 18 | 16 |
          +  +  +  +  +  +  +

C6  f × | 30 | 28 | 26 | 24 | 22 | 20 | 18 |
          +  +  +  +  +  +  +

C7  h × | 45 | 43 | 41 | 39 | 37 | 35 | 33 |
          +  +  +  +  +  +  +

C8  g × | 44 | 42 | 40 | 38 | 36 | 34 | 32 |
          +  +  +  +  +  +  +

C9  i × | 46 | 44 | 42 | 40 | 38 | 36 | 34 |

$P1=1$ $Q=7$ $R4=13$ $S3=2$

First row of output data of the output matrix of the network layer A: | V7 | V6 | V5 | V4 | V3 | V2 | V1 |

FIG. 2H

IMAGE ANALYSIS METHOD AND RELATED DEVICE

CROSS-REFERENCE TO RELATED APPLICATION

This application claims the benefit of priority from Chinese Patent Application No. 202010015744.6, entitled "CONVOLUTION CALCULATION METHOD AND RELATED DEVICE" and filed on Jan. 7, 2020, the content of which is hereby incorporated by reference in its entirety.

BACKGROUND

1. Technical Field

The present disclosure generally relates to neural network technology field, and especially relates to an image analysis method based on a convolutional neural network and a related device.

2. Description of Related Art

At present, neural network processors include a plurality of network layers, with different network layers corresponding to different convolution step lengths. The neural network processor is configured to perform a plurality of times of convolution calculation according to an input matrix and a convolution kernel of the network layer, to obtain an output matrix (a plurality of features included in an image) of the network layer. A process that convolution calculation is performed every time, according to the input matrix (obtained based on input images) and the convolution kernel of the network layer, is as follows: firstly, the neural network processor selects an operation matrix from the input matrix of the network layer according to the convolution step length; then, the neural network processor performs convolution calculation on the operation matrix and the convolution kernel. Such convolution calculation mode results in low computational efficiency of the neural network processor under different convolution step lengths, and further indirectly reduces efficiency of image analysis.

SUMMARY

The present disclosure provides an image analysis method based on a convolutional neural network and a related device which can improve calculation efficiency of a neural network processor under different convolution step lengths, and then indirectly improve efficiency of image analysis.

In a first aspect, an image analysis method based on a convolutional neural network according to an embodiment of the present disclosure is applied to a neural network processor, the method includes:

obtaining an input matrix of a network layer A, wherein the network layer A is one of a plurality of network layers included in a convolutional neural network model, and the input matrix of the network layer A is obtained based on a target type image;

obtaining a target convolution kernel and a target convolution step length corresponding to the network layer A, different network layers corresponding to different convolution step lengths;

performing convolution calculation on the input matrix of the network layer A and the target convolution kernel according to the target convolution step length, to obtain an output matrix of the network layer A, wherein the target convolution step length is configured to screen a plurality of rows of input data required by the convolution calculation from the input matrix of the network layer A, and the output matrix of the network layer A is configured to represent a plurality of features included in the target type image;

determining a target preset operation corresponding to the target type image according to a mapping relationship between pre-stored type images and preset operations; and performing the target preset operation according to the plurality of features included in the target type image.

In a possible implementation, the target type image is a face image, the plurality of features included in the target type image is a plurality of face features, and the step of performing the target preset operation according to the output matrix of the network layer A, includes:

determining whether a face feature set formed by the plurality of face features matches with a face feature library;

if the face feature set formed by the plurality of face features matches with a target face feature set, determining target character information corresponding to the target face feature set included in the face feature library, according to a mapping relationship between a pre-stored face feature set and character information; and performing an output operation on the target character information.

In a possible implementation, the target type image is a license plate image, a plurality of features included in the target type image is a target license plate number, and the step of performing the target preset operation according to the output matrix of the network layer A, includes:

determining whether the target license plate number matches with a license plate number library;

if the target license plate number matches with the license plate number library, determining target license plate registration information corresponding to the target license plate number, according to a mapping relationship between pre-stored license plate numbers and vehicle registration information; and performing the output operation on the target license plate registration information.

In a possible implementation, the target convolution step length is $S1 \times S2$, a size of the input matrix of the network layer A is $R1 \times R2$, a size of the target convolution kernel is $F \times F$, and the step of performing convolution calculation on the input matrix of the network layer A and the target convolution kernel according to the target convolution step length, to obtain the output matrix of the network layer A, includes:

when both S1 and S2 are 1, obtaining input data from an i-th row to a (i+F−1)-th row of the input matrix of the network layer A, wherein i is any one of 1 to (R1−F+1);

performing convolution calculation on the input data from the i-th row to the (i+F−1)-th row and the target convolution kernel, to obtain the i-th row of output data of the output matrix of the network layer A; and obtaining the output matrix of the network layer A, according to (R1−F+1) rows of output data, the (R1−F+1) rows of output data including the i-th row of output data.

In a possible implementation, the target convolution step length is $S3 \times S4$, the size of the input matrix of the network layer A is $R3 \times R4$, the size of the target convolution kernel is $F \times F$, and the step of performing convolution calculation on the input matrix of the network layer A and the target convolution kernel according to the target convolution step length, to obtain the output matrix of the network layer A, includes:

when both S1 and S2 are 2, obtaining input data from a (2j−1)-th row to a (2j+1)-th row of the input matrix of the network layer A, wherein j is any one of 1 to [(R3−F)/S4+1];

screening the input data from the (2j−1)-th row to the (2j+1)-th row according to the target convolution step length, to obtain the input data from the (2j−1)-th row to the (2j+1)-th row that has been screened;

performing convolution calculation on the input data from the (2j−1)-th row to the (2j+1)-th row that has been screened and the target convolution kernel, to obtain a j-th row of output data of the output matrix of the network layer A; and obtaining the output matrix of the network layer A according to [(R3−F)/S4+1] rows of output data, the [(R3−F)/S4+1] rows of output data including the j-th row of output data.

In a second aspect, an image analysis device based on a convolutional neural network according to an embodiment of the present disclosure is applied to a neural network processor, includes:

a first obtaining unit configured to obtain an input matrix of a network layer A, wherein the network layer A is one of a plurality of network layers included in a convolutional neural network model, and the input matrix of the network layer A is obtained based on a target type image;

a second obtaining unit configured to obtain a target convolution kernel and a target convolution step length corresponding to the network layer A, different network layers corresponding to different convolution step lengths;

a calculation unit configured to perform convolution calculation on the input matrix of the network layer A and the target convolution kernel according to the target convolution step length, to obtain an output matrix of the network layer A, wherein the target convolution step length is configured to screen a plurality of rows of input data required by the convolution calculation from the input matrix of the network layer A, and the output matrix of the network layer A is configured to represent a plurality of features included in the target type image;

a determining unit configured to determine a target preset operation corresponding to the target type image according to a mapping relationship between pre-stored type images and preset operations; and an execution unit configured to perform the target preset operation according to the plurality of features included in the target type image.

In a third respect, a neural network processor according to an embodiment of the present disclosure is configured to implement some or all steps of the method in the first aspect.

In a fourth respect, a neural network processor according to an embodiment of the present disclosure includes an image analysis device of the above second aspect of the present disclosure.

In a fifth respect, an electronic device according to an embodiment of the present disclosure includes a processor, a memory, a communication interface, and one or more programs stored in the memory and performed by the processor, the one or more programs including instructions that is performed by a processor to implement some or all steps of the method in the first aspect.

In a sixth respect, a computer readable storage medium according to an embodiment of the present disclosure is configured to store computer programs, the computer programs performed by a processor to implement some or all steps of the method in the first aspect.

In a seventh respect, a computer product according to an embodiment of the present disclosure includes a non-instantaneous computer readable storage medium that stores computer programs therein, the computer programs performed by a computer to implement some or all steps of the method in the first aspect. The computer product can be a software installation package.

As can be seen that, compared with the conventional art, when the neural network processor performs convolution calculation on the operation matrix and the convolution kernel, according to the input matrix (obtained based on the input image) and the convolution kernel of the network layer every time, the neural network processor needs to select the operation matrix from the input matrix of the network layer according to the convolution step length. In the present disclosure, for different convolution step lengths, since the convolution step length is configured to screen the plurality of rows of input data from the input matrix of network layer A that is required by the convolution calculation (obtained based on the target type image), the neural network processor performs convolution calculation on the plurality of rows of input data and the convolution kernel that are required by the convolution calculation, to obtain the output matrix (representing a plurality of features included in the target type image) of the network layer A, thereby the calculation efficiency of the neural network processor under different convolution step lengths can be improved. Because a time for obtaining the plurality of features included in the target type image is greatly shortened, the target preset operation corresponding to the target type image can be performed more quickly based on the plurality of features included in the target type image, thus, the efficiency of image analysis can be further improved indirectly.

BRIEF DESCRIPTION OF THE DRAWINGS

In order to more clearly understand the technical solution hereinafter in embodiments or the related art of the present disclosure, a brief description to the drawings used in detailed description of embodiments hereinafter or the related art of the present disclosure is provided thereof.

FIG. 2F is a block diagram of determining the output matrix of the network layer A in accordance with an embodiment of the present disclosure.

FIG. 2G is a block diagram of screening input data from a first row to a third row in accordance with an embodiment of the present disclosure.

FIG. 2H is a block diagram of determining the output matrix of the network layer A in accordance with another embodiment of the present disclosure.

DETAILED DESCRIPTION

Figure 1:
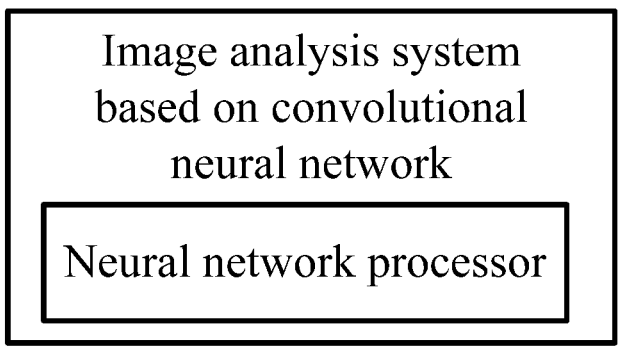
FIG. 1 is a block diagram of an image analysis system based on a convolutional neural network in accordance with an embodiment of the present disclosure.

Referring to FIG. 1, a block diagram of an image analysis system based on a convolutional neural network in accordance with an embodiment of the present disclosure is shown. The image analysis system based on the convolutional neural network includes a neural network processor configured to:

obtain an input matrix of a network layer A, wherein the network layer A is one of a plurality of network layers included in a convolutional neural network model, and the input matrix of the network layer A is obtained based on a target type image;

obtain a target convolution kernel and a target convolution step length corresponding to the network layer A, different network layers corresponding to different convolution step lengths;

perform convolution calculation on the input matrix of the network layer A and the target convolution kernel according to the target convolution step length, to obtain an output matrix of the network layer A, wherein the target convolution step length is configured to screen a plurality of rows of input data required by the convolution calculation from the input matrix of the network layer A, and the output matrix of the network layer A is configured to represent a plurality of features included in the target type image;

determine a target preset operation corresponding to the target type image according to a mapping relationship between pre-stored type images and preset operations; and perform the target preset operation according to the plurality of features included in the target type image.

Figure 2A:
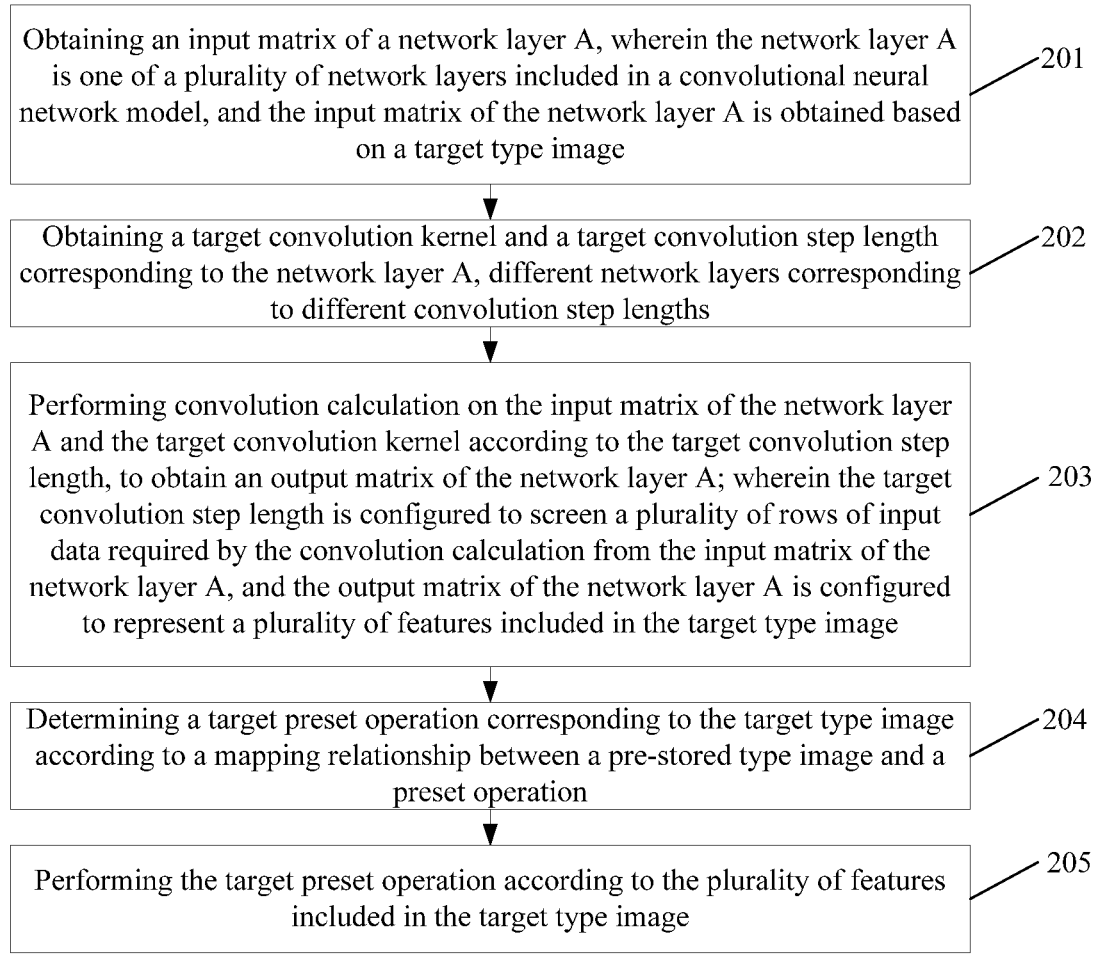
FIG. 2A is a flowchart of an image analysis method based on a convolutional neural network in accordance with an embodiment of the present disclosure.

Referring to FIG. 2A, a flowchart of an image analysis method based on the convolutional neural network in accordance with an embodiment of the present disclosure is shown. The image analysis method based on the convolutional neural network is applied to the neural network processor and includes steps 201-205, specifically as follows:

step 201, the neural network processor obtains an input matrix of a network layer A, wherein the network layer A is one of a plurality of network layers included in a convolutional neural network model, and the input matrix of the network layer A is obtained based on a target type image.

The plurality of network layers include an input layer, a convolutional layer, a pooling layer, a full connection layer and an output layer.

The input matrix of the network layer A can be obtained based on a face image or a license plate image, which is not limited herein. The face image or the license plate image is captured through a camera.

Step 202, the neural network processor obtains a target convolution kernel and a target convolution step length corresponding to the network layer A, different network layers correspond to different convolution step lengths;

In a possible implementation, the step of obtaining, by the neural network processor, the target convolution kernel and the target convolution step length corresponding to the network layer A includes:

obtaining, by the neural network processor, the target convolution kernel corresponding to the network layer A, according to a mapping relationship between network layers and convolution kernels;

obtaining, by the neural network processor, the target convolution step length corresponding to the network layer A, according to a mapping relationship between the network layers and convolution step lengths.

The mapping relationship between the network layers and the convolution kernels is pre-stored in the neural network processor, which is shown in the following table 1:

TABLE 1

| Network layer | Convolution kernel |
| --- | --- |
| Input layer | First convolution kernel |
| Convolutional layer | Second convolution kernel |
| Pooling layer | Third convolution kernel |
| Full connection layer | Fourth convolution kernel |
| Output layer | Fifth convolution kernel |

The mapping relationship between the network layers and the convolution step lengths is pre-stored in the neural network processor, which is shown in the following table 2:

TABLE 2

| Network layer | Convolution step length |
| --- | --- |
| Input layer | First convolution step length |
| Convolutional layer | Second convolution step length |
| Pooling layer | Third convolution step length |
| Full connection layer | Fourth convolution step length |
| Output layer | Fifth convolution step length |

The neural network processor can also obtain the target convolution step length corresponding to the network layer A by sending a convolution step length acquisition request carrying the network layer A to a central processor, the convolution step length acquisition request configured to indicate the central processor to feed back the convolution step length of the network layer A; and receive the target convolution step length of the network layer A sent by the central processor based on the convolution step length acquisition request.

Step 203, performing, by the neural network processor, convolution calculation on the input matrix of the network layer A and the target convolution kernel according to the target convolution step length, to obtain an output matrix of the network layer A, wherein the target convolution step length is configured to screen a plurality of rows of input data required by the convolution calculation from the input matrix of the network layer A, and the output matrix of the network layer A is configured to represent a plurality of features included in the target type image.

In a possible implementation, the neural network processor includes P2 processing units, each of the P2 processing elements includes Q multiply accumulate units, and both P2 and Q are integers greater than 1. Before the neural network processor performs convolution calculation on the input matrix of the network layer A and the target convolution kernel according to the target convolution step length to obtain the output matrix of the network layer A, the method further includes:

padding, by the neural network processor, the input matrix of the network layer A according to the target convolution kernel and the target convolution step length, to obtain a first input matrix of the network layer A; and determining, by the neural network processor, P1 processing elements required for performing convolution calculation on the first input matrix of the network layer A, according to the first input matrix of the network layer A, the P2 processing elements and the Q multiply accumulate units, In a possible implementation, a size of the target convolution kernel is F×F, and the target convolution step length is S5×S6, the step of padding, by the neural network processor, the input matrix of the network layer A according to the target convolution kernel and the target convolution step length, to obtain the first input matrix of the network layer A, including:

a size of the input matrix of the network layer A obtained by the neural network processor is R5×R6;

the neural network processor configured to calculate (R5−F)/S6 to obtain a first remainder, and determine row padding data corresponding to the input matrix of the network layer A, according to the first remainder and S6;

the neural network processor configured to calculate (R6−F)/S5 to obtain a second remainder, and determine column padding data corresponding to the input matrix of the network layer A, according to the second remainder and S5; and the neural network processor configured to perform a padding operation on the input matrix of the network layer A according to the row padding data and the column padding data, to obtain a first input matrix of the network layer A.

The target convolution step length includes a horizontal convolution step length with being S5, and a vertical convolution step length with being S6.

The input matrix of the network layer A includes R5 rows of input data and R6 columns of input data.

Specifically, an implementation of determining, by the neural network processor, the row padding data corresponding to the input matrix of the network layer A according to the first remainder and S6 can be:

if the first remainder is 0 and S6 is 1 or 2, the neural network processor determines that the row padding data corresponding to the input matrix of the network layer A is a 0-th row of input data and a (R5+1)-th row of input data;

if the first remainder is 0 and S6 is an odd number greater than 1, the neural network processor determines that the row padding data corresponding to the input matrix of the network layer A is input data from a [−(S6+1)/2+2]-th row to the 0-th row, and input data from the (R5+1)-th row to a [R5+(S6+1)/2]-th row;

if the first remainder is 0 and S6 is an even number greater than 2, the neural network processor determines that the row padding data corresponding to the input matrix of the network layer A is input data from a (−S6/2+1)-th row to the 0-th row, and input data from the (R5+1)-th row to a (R5+S6/2)-th row.

If the first remainder is not 0 and S6 is 2, the neural network processor determines that the row padding data corresponding to the input matrix of the network layer A is the 0-th row of input data, the (R5+1)-th row of input data, and a (R5+2)-th row of input data;

if the first remainder is not 0, a difference value T1 between S6 and the first remainder is 1, and S6 is an odd number greater than 2, the neural network processor determines that the row padding data corresponding to the input matrix of the network layer A is input data from a [−(T1+1)/2+1]-th row to the 0-th row, and input data from the (R5+1)-th row to a [R5+(T1+1)/2]-th row;

if the first remainder is not 0, the difference value T1 between S6 and the first remainder is 1, and S6 is an even number greater than 2, the neural network processor determines that the row padding data corresponding to the input matrix of the network layer A is input data from a [−(T1+2)/2+2]-th row to the 0-th row, and input data from the (R5+1)-th row to a [R5+(T1+2)/2]-th row;

if the first remainder is not 0, and the difference value T1 between S6 and the first remainder is an odd number greater than 1, the neural network processor determines that the row padding data corresponding to the input matrix of the network layer A is input data from a [−(T1+1)/2+2]-th row to the 0-th row, and input data from the (R5+1)-th row to a [R5+(T1+1)/2]-th row;

if the first remainder is not 0, and the difference value T1 between S6 and the first remainder is an even number greater than 1, the neural network processor determines that the row padding data corresponding to the input matrix of network layer A is input data from a (−T1/2+1)-th row to the 0-th row, and input data from the (R5+1)-th row to a (R5+T1/2)-th row.

Specifically, an implementation of determining, by the neural network processor, the column padding data corresponding to the input matrix of the network layer A according to the second remainder and S6 can be:

if the second remainder is 0 and S5 is 1 or 2, the neural network processor determines that the column padding data corresponding to the input matrix of the network layer A is a 0-th column of input data and a (R6+1)-th column of input data;

if the second remainder is 0 and S5 is an odd number greater than 1, the neural network processor determines that the column padding data corresponding to the input matrix of the network layer A is input data from a [−(S5+1)/2+2]-th column to the 0-th column, and input data from the (R6+1)-th column to a [R6+(S5+1)/2]-th column;

if the second remainder is 0 and S5 is an even number greater than 2, the neural network processor determines that the column padding data corresponding to the input matrix of network layer A is input data from a (−S5/2+1)-th column to the 0-th column, and input data from the (R6+1)-th column to a (R6+S5/2)-th column;

if the second remainder is not 0 and S5 is 2, the neural network processor determines that the column padding data corresponding to the input matrix of the network layer A is the 0-th column of input data, the (R6+1)-th column of input data, and a (R6+2)-th of column input data;

if the second remainder is not 0, a difference value T2 between S5 and the second remainder is 1, and S5 is an odd number greater than 2, the neural network processor determines that the column padding data corresponding to the input matrix of the net layer A is input data from a [−(S5+1)/2+1]-th column to the 0-th column, and input data from the (R6+1)-th column to a [R6+(S5+1)/2]-th column;

if the second remainder is not 0, the difference value T2 between S5 and the second remainder is 1, and S5 is an even number greater than 2, the neural network processor determines that the column padding data corresponding to the input matrix of the net layer A is input data from a [−(S5+2)/2+2]-th column to the 0-th column, and input data from the (R6+1)-th column to a [R6+(S5+2)/2]-th column;

if the second remainder is not 0 and the difference value T2 between S5 and the second remainder is an odd number greater than 1, the neural network processor determines that the column padding data corresponding to the input matrix of the network layer A is input data from a [−(T2+1)/2+2]-th column to the 0-th column, and input data from the (R6+1)-th column to a [R6+(T2+1)/2]-th column;

if the second remainder is not 0 and the difference value T2 between S5 and the second remainder is an even number greater than 1, the neural network processor determines that the column padding data corresponding to the input matrix of network layer A is input data from the a $(-T2/2+1)$-th column to the 0-th column, and input data from the (R6+1)-th column to a (R6+T2/2)-th column.

Figure 2B:
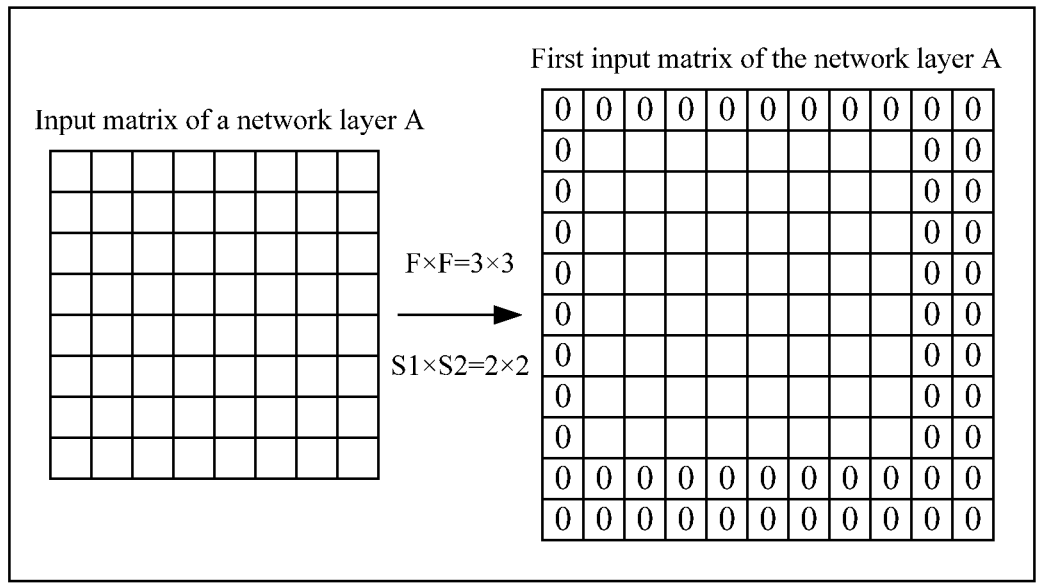
FIG. 2B is a block diagram of a padding way in accordance with an embodiment of the present disclosure.

For example, referring to FIG. 2B, a block diagram of a padding way in accordance with an embodiment of the present disclosure is shown. The size of the input matrix of the network layer A is 8×8, the size of the target convolution kernel is 3×3, and the target convolution step length is 2×2. In this way, the neural network processor determines that the row padding data corresponding to the input matrix of the network layer A is the 0-th row of input data, a ninth row of input data and a tenth row of input data, while, the neural network processor determines that the column padding data corresponding to the input matrix of the network layer A is the 0-th column of input data, a ninth column of padding data, and a tenth column of input data. And then, the neural network processor performs a padding operation on the input matrix of the network layer A, according to the row padding data and the column padding data corresponding to the input matrix of the network layer A, so as to obtain the first input matrix of the network layer A.

In a possible implementation, the neural network processor determines the P1 processing elements that are required for performing convolution calculation on the first input matrix of the network layer A, according to the first input matrix of the network layer A, P2 and Q, including:

a size of first input matrix of the network layer A obtained by the neural network processor is R7×R8;

calculating, by the neural network processor, R8/Q to obtain a quotient and a third remainder;

if the third remainder is 0, the neural network processor determines that the quotient is P1, and determines that each of the P1 processing elements includes Q multiply accumulate units; wherein P1 is the number of processing elements required for performing convolution calculation on the first input matrix of network layer A;

if the third remainder is not 0, the neural network processor determines that the quotient plus 1 is P1, and determines that the number that Q multiply accumulate units are included in each processing element from a first processing element to a (P1−1)-th processing element among the P1 processing elements, and the number that the multiply accumulate units are included in a P1-th processing element, is the third remainder; wherein P1 is the number of processing elements required for performing convolution calculation on the first input matrix of network layer A.

Figure 2C:
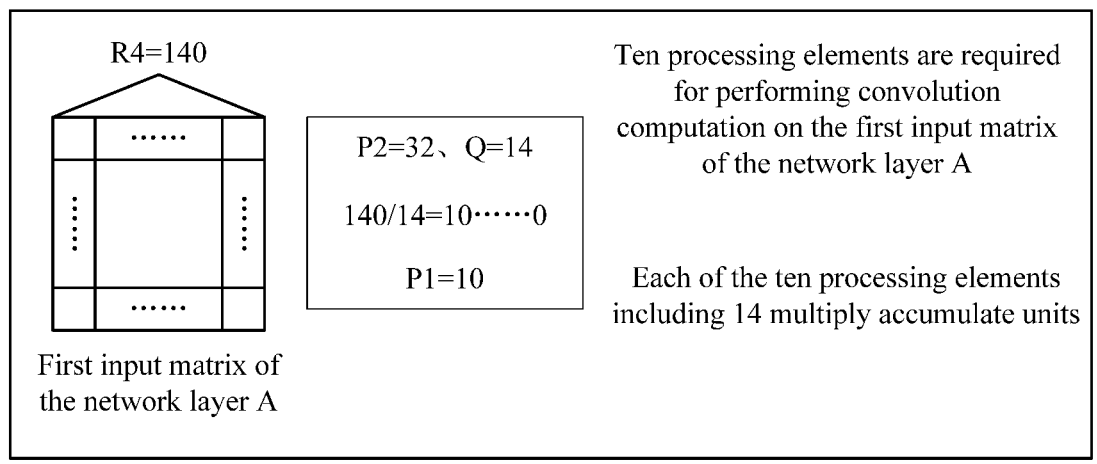
FIG. 2C is a block diagram of determining P1 processing elements required for performing convolution calculation on a first input matrix of a network layer A in accordance with an embodiment of the present disclosure.

For example, referring to FIG. 2C, a block diagram of determining P1 processing elements required for performing convolution calculation on the first input matrix of the network layer A in accordance with an embodiment of the present disclosure is shown. The first input matrix of the network layer A includes 140 columns of input data, P2=32, Q=14, the neural network processor calculates that 140 is divided by 14 to obtain the quotient is 10 and the third remainder is 0, the neural network processor determines that 10 processing elements are required for performing convolution calculation on the first input matrix of the network layer A, and each of the 10 processing elements includes 14 multiply accumulate units.

A size of the output matrix of the network layer A is R9×R10, wherein, R9=(R7−F)/S6+1, and R10=(R8−F)/S5+1.

In a possible implementation, the target convolution step length is S1×S2, the size of the input matrix of the network layer A is R1×R2, the size of the target convolution kernel is F×F, and the step of performing convolution calculation on the input matrix of the network layer A and the target convolution kernel according to the target convolution step length, to obtain the output matrix of the network layer A, includes:

when both S1 and S2 are 1, obtaining, by the neural network processor, input data from an i-th row to a (i+F−1)-th row of the input matrix of the network layer A, wherein i is any one of 1 to (R1−F+1);

performing, by the neural network processor, convolution calculation on the input data from the i-th row to the (i+F−1)-th row, and the target convolution kernel, to obtain the i-th row of output data of the output matrix of the network layer A; and obtaining, by the neural network processor, the output matrix of the network layer A, according to (R1−F+1) rows of output data, the (R1−F+1) rows of output data including the i-th row of output data.

Specifically, the target convolution kernel includes 9 element values (c, b, a, f, e, d, i, h, g), an implementation that the neural network processor performs convolution calculation on the input data from the i-th row to the (i+F−1)-th row, and the target convolution kernel by using the P1 processing elements, to obtain the i-th row of output data of the output matrix of the network layer A, can be as follows:

step B1, using, by the neural network processor, the P1 processing elements to multiply the i-th row of input data by b, to obtain R2 first intermediate values;

step B2, performing a left-shift operation on the i-th row of input data by using the P1 processing elements, and then multiplying the i-th row of output data that has been completed the left-shift operation by a, to obtain R2 second intermediate values, finally accumulating the R2 second intermediate values with the R2 first intermediate values respectively, to obtain R2 third intermediate values;

step B3, performing a right-shift operation on the i-th row of input data by using the P1 processing elements, and then multiplying the i-th row of output data that has been completed the right-shift operation by c, to obtain R2 fourth intermediate values, finally accumulating the R2 second intermediate values with the R2 third intermediate values respectively, to obtain R2 fifth intermediate values;

step B4, using, by the neural network processor, the P1 processing elements to multiply a (i+1)-th row of input data by e, to obtain R2 sixth intermediate values, and accumulating the R2 sixth intermediate values with the R2 fifth intermediate values respectively, to obtain R2 seventh intermediate values;

step B5, performing the left-shift operation on the (i+1)-th row of input data by using the P1 processing elements, and then multiplying the (i+1)-th row of output data that has been completed the left-shift operation by d, to obtain R2 eighth intermediate values, finally accumulating the R2 eighth intermediate values with the R2 seventh intermediate values respectively, to obtain R2 ninth intermediate values;

step B6, performing the right-shift operation on the (i+1)-th row of input data by using the P1 processing elements, and then multiplying the (i+1)-th row of output data that has been completed the right-shift operation by f, to obtain R2 tenth intermediate values, finally accumulating the R2 tenth intermediate values with the R2 ninth intermediate values respectively, to obtain R2 eleventh intermediate values;

step B7, using, by the neural network processor, the P1 processing elements to multiply the i-th row of input data by h, to obtain R2 twelfth intermediate values, and accumulating the R2 twelfth intermediate values with the R2 eleventh intermediate values respectively, to obtain R2 thirteenth intermediate values;

step B8, performing the left-shift operation on the (i+F−1)-th row of input data by using the P1 processing elements, and then multiplying the (i+F−1)-th row of output data that has been completed the left-shift operation by i, to obtain R2 fourteenth intermediate values, finally accumulating the R2 fourteenth intermediate values with the R2 thirteenth intermediate values respectively, to obtain R2 fifteenth intermediate values;

step B9, performing the right-shift operation on the (i+F−1)-th row of input data by using the P1 processing elements, and then multiplying the (i+F−1)-th row of output data that has been completed the right-shift operation by i, to obtain R2 sixteenth intermediate values, finally accumulating the R2 sixteenth intermediate values with the R2 fifteenth intermediate values respectively, to obtain R2 seventeenth intermediate values.

At least one multiply accumulate unit included in each of the P1 processing elements is operated in parallel.

The left-shift of each row of input data from the i-th row to the (i+F−1)-th row is implemented by a left-shift program, and the right-shift of each row of input data from the i-th row to the (i+F−1)-th row is implemented by a right-shift program. Both the left-shift program and the right-shift program are pre-stored in the neural network processor.

Figure 2D:
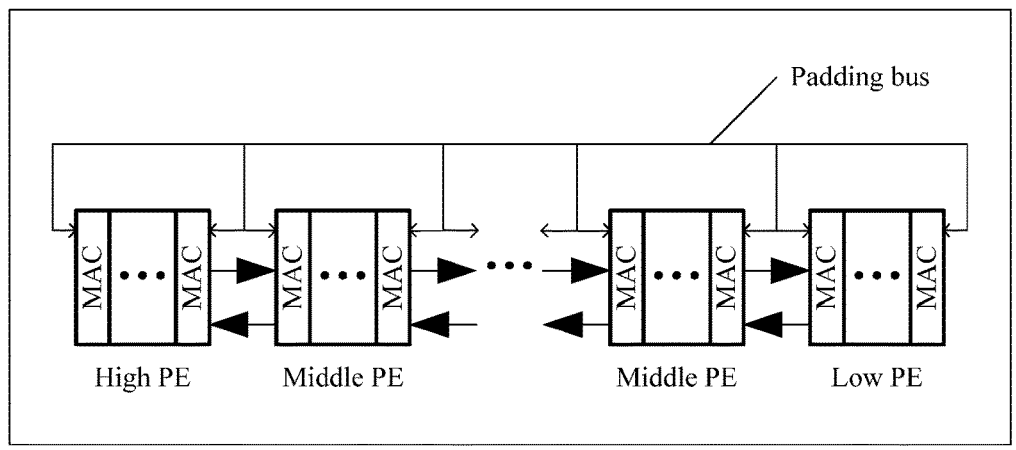
FIG. 2D is a block diagram of a plurality of processing elements in accordance with an embodiment of the present disclosure.

Referring to FIG. 2D, a block diagram of a plurality of processing elements provided by an embodiment of the present disclosure is shown. The plurality of processing elements (PEs) includes a high (High) PE, a plurality of middle (Middle) PEs, and a low (Low) PE, and for any two adjacent multiply accumulate units (MACs) in each PE, the MAC arranged on the left is taken as the high MAC, and the MAC arranged on the right is taken as the low MAC;

The processing element, hereinafter this text is abbreviated as the PE, and the multiply accumulate unit is abbreviated as the MAC.

When moving the high PE to the left, the high MAC is configured to obtain data from a right MAC within the PE, and the lowest MAC is configured to obtain data from the high MAC of a right PE; when moving the high PE to the right, the highest MAC is configured to obtain data from a padding bus, a low MAC is configured to obtain data from the left MAC within the PE, and the padding bus is configured for data transmission between padding data and the PE;

When moving the low PE to the left, the high MAC is configured to obtain data from the right MAC within the PE, and the lowest MAC is configured to obtain data from the padding bus; when moving the low PE to the right, the highest MAC is configured to obtain data from the low MAC of a left PE, and the low MAC is configured to obtain data from the left MAC within the PE;

When moving the middle PE to the left, the high MAC is configured to obtain data from the right MAC within the PE, and the lowest MAC is configured to obtain data from the high MAC of the right PE; when moving the middle PE to the right, the highest MAC is configured to obtain data from the low MAC within the left PE, and the low MAC gets data from the left MAC within the PE.

In an embodiment of the present disclosure, a group of processing elements includes the P1 processing elements that process a row of input data in parallel, and data between adjacent processing elements can be mutually shifted to the left or the right. However, in the conventional convolution calculation mode, data between adjacent processing elements can't be shifted, when the group of processing elements performs convolution calculation on the input matrix and the convolution kernel matrix every time.

When F isn't three, an implementation that the neural network processor performs convolution calculation on the input data from the i-th row to the (i+F−1)-th row and the target convolution kernel by using the P1 processing elements, to obtain the i-th row of output data of the output matrix of the network layer A, can be referred to the implementation that, when F is three, the neural network processor performs convolution calculation on the input data from the i-th row to the (i+F−1)-th row and the target convolution kernel by using the P1 processing elements, to obtain the i-th row of output data of the output matrix of the network layer A, which is not be described herein.

Figure 2E:
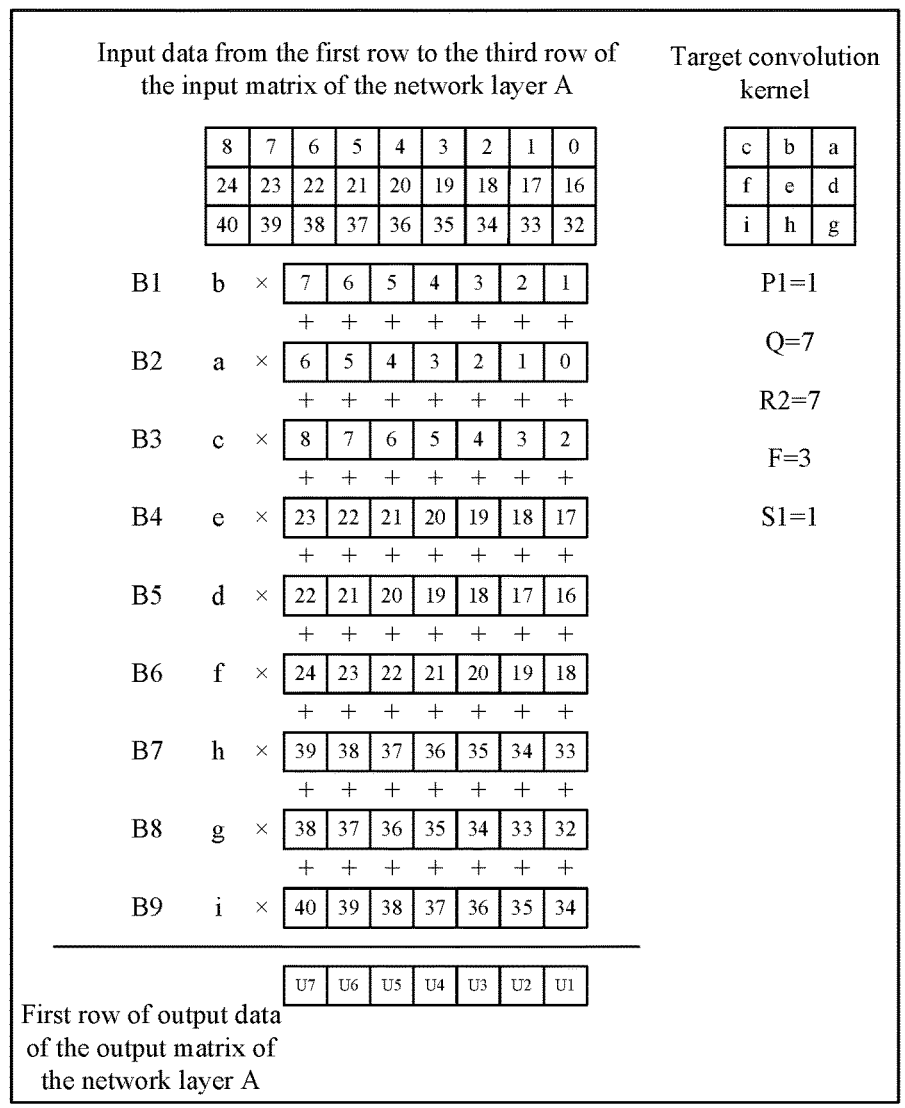
FIG. 2E is a block diagram of determining an i-th row of output data of an output matrix of the network layer A in accordance with an embodiment of the present disclosure.

For example, referring to FIG. 2E, a block diagram of determining the i-th row of output data of the output matrix of the network layer A in accordance with an embodiment of the present disclosure is shown. Wherein, P1=1, Q=7, R2=7, F=3, S1=1 and i=1, each row of input data from a first row to a third row of the input matrix of the network layer A includes 7 element values. Both 0 and 8 in the first row of input data are padding data, both 16 and 12 in a second row of input data are padding data, and both 32 and 40 in the third row of input data are padding data. The target convolution kernel includes 9 element values (c, b, a, f, e, d, i, h, g), the neural network processor uses 7 multiply accumulate units to perform convolution calculation on the input data from the first row to the third row of the input matrix of the network layer A, and the target convolution kernel, so that the first row of output data of the output matrix of the network layer A are obtained as (U1, U2, U3, U4, U5, U6, U7).

It can be seen that, in this example, the neural network processor performs convolution calculation on the input data from the i-th row to the (i+F−1)-th row of the input matrix of the network layer A, and the target convolution kernel by using the P1 processing elements, to obtain the i-th row of output data of the output matrix of the network layer A, which can help to improve computational efficiency of the neural network processor, since the P1 processing elements are operated in parallel.

Specifically, the target convolution kernel further includes a bias value, and the implementation that the neural network processor obtains the output matrix of the network layer A, according to (R1−F+1) rows of output data, can be: the neural network processor determines a to-be-output matrix of the network layer A according to the (R3−F+1) rows of output data; the neural network processor determines the sum of the element value and the bias value which are in row in and column n of the to-be-output matrix of the network layer A, as the element value which is in row in and column n of the output matrix of the network layer A; the neural network processor performs the same operation on [(R1−F+1)×(R2−F+1)−1] element values of the to-be-output matrix of the network layer A, except the element value in row in and column n of the to-be-output matrix of the network layer A, among [(R1−F+1)×(R2−F+1)] element values of the to-be-output matrix of the network layer A, to obtain [(R1−F+1)×(R2−F+1)−1] element values of the output matrix of the network layer A, wherein the [(R1−F+1)×(R2−F+1)−1] element values of the output matrix of the network layer A are in one-to-one correspondence with the [(R1−F+1)×(R2−F+1)−1] element values of the to-be-output matrix of the network layer A, among the [(R1−F+1)×(R2−F+1)] element values of the to-be-output matrix of the network layer A, except the element value in row in and column n of the to-be-output matrix of the network layer A; the neural network processor determines the output matrix of the network layer A, according to the element value in row m and column n of the output matrix of the network layer A and the [(R1−F+1)×(R2−F+1)−1] element values of the output matrix of the network layer A.

For example, referring to FIG. 2F, a block diagram of determining the output matrix of the network layer A in accordance with an embodiment of the present disclosure is shown. Wherein, R1=5 and F=3, output data in row 1 of the output matrix of the network layer A includes 3 element values (2, 4, 3), output data in row 2 of the output matrix of the network layer A includes 3 element values (5, 7, 8), output data in row 3 of the output matrix of the network layer A includes 3 element values (9, 1, 6), and the bias value is 1, thereby the neural network processor determines the nine element values (3, 5, 4, 6, 8, 9, 10, 2, 7) included in the output matrix of the network layer A.

When S1 is 1, output data in row i of the output matrix of the network layer A is (U1, U2, U3, U4, U5, U6, U7, U8, U9), and when S1 is 3, the output data in row i of the output matrix of the network layer A is (U1, U4, U7).

When S1 is 1, the output data in row i of the output matrix of the network layer A is (U1, U2, U3, U4, U5, U6, U7, U8, U9, U10, U11, U12, U13, U14, U15), and when S1 is 5, the output data in row i of the output matrix of the network layer A is (U1, U6, U11).

When S1 is 1, the output data in row i of the output matrix of the network layer A is (U1, U2, U3, U4, U5, U6, U7, U8, U9, U10, U11, U12, U13, U14, U15, U16, U17, U18, U19, U20, U21), and when S1 is 7, the output data in row i of the output matrix of the network layer A is (U1, U8, U15).

In a possible implementation, the target convolution step length is S3×S4, the size of the input matrix of the network layer A is R3×R4, the size of the target convolution kernel is F×F, and the step of performing, by the neural network processor, convolution calculation on the input matrix of the network layer A and the target convolution kernel according to the target convolution step length, to obtain the output matrix of the network layer A, includes:

when both S3 and S4 are 2, obtaining, by the neural network processor, input data from a (2j−1)-th row to a (2j+1)-th row of the input matrix of the network layer A, wherein j is any one of 1 to [(R3−F)/S4+1];

screening, by the neural network processor, the input data from the (2j−1)-th row to the (2j+1)-th row according to the target convolution step length, to obtain the input data from the (2j−1)-th row to the (2j+1)-th row that has been screened;

performing, by the neural network processor, convolution calculation on the input data from the (2j−1)-th row to the (2j+1)-th row that has been screened, and the target convolution kernel, to obtain a j-th row of output data of the output matrix of the network layer A; and obtaining, by the neural network processor, the output matrix of the network layer A according to [(R3−F)/S4+1] rows of output data, the [(R3−F)/S4+1] rows of output data including the j-th row of output data.

In a possible implementation, the step of screening, by the neural network processor, the input data from the (2j−1)-th row to the (2j+1)-th row according to the target convolution step length, to obtain the input data from the (2j−1)-th row to the (2j+1)-th row that has been screened, includes:

performing, by the neural network processor, F times of screening on the (2j−1)-th row of input data according to S3, to obtain the (2j−1)-th row of input data that has been screened, the (2j−1)-th row of input data that has been screened including F sub-input data in the (2j−1)-th row, and the number of data in each sub-input data of the (2j−1)-th row is half of that of the (2j−1)-th row of input data;

performing, by the neural network processor, F times of screening on a (2j)-th row of input data according to S3, to obtain the (2j)-th row of input data that has been screened, the (2j)-th row of input data that has been screened including F sub-input data of the (2j)-th row, and the number of data in each sub-input data of the (2j)-th row is half of that of the (2j)-th row of input data; and performing, by the neural network processor, F times of screening on the (2j+1)-th row of input data according to S3, to obtain the (2j+1)-th row of input data that has been screened, the (2j+1)-th row of input data that has been screened including F sub-input data of the (2j−1)-th row, and the number of data in each sub-input data of the (2j−1)-th row is half of that of the (2j+1)-th row of input data.

For example, referring to FIG. 2G a block diagram of screening the input data from a first row to a third row in accordance with an embodiment of the present disclosure is shown. Wherein the number of data in each row of the input data from the first row to the third row is 15, both 0 and 14 in the first row of input data are padding data, both 16 and 30 in a second row of input data are padding data, both 32 and 46 in the third row of input data are padding data, and a horizontal convolution step length S3 is 2. Performing three times of screening on the first row of input data, to obtain three sub-input data of the first row; performing three times of screening on the second row of input data, to obtain three sub-input data of the second row; and performing three times of screening on the third row of input data, to obtain three sub-input data of the third row.

Specifically, the target convolution kernel includes 9 element values (c, b, a, f, e, d, i, h, g), and the neural network processor performs convolution calculation on the input data from the (2j−1)-th row to the (2j+1)-th row, and the target convolution kernel by using the P1 processing elements, so that an embodiment of obtaining the j-th row of output data of the output matrix of the network layer A can be as follows:

step C1, selecting, by the neural network processor, R4/S3 first to-be-multiplied element values from the (2j−1)-th row of input data according to S3, and respectively multiplying the R4/S3 first to-be-multiplied element values by b, by using the P1 processing elements, to obtain R4/S3 eighteenth intermediate values;

step C2, selecting, by the neural network processor, R4/S3 second to-be-multiplied element values from the (2j−1)-th row of input data according to S3, and respectively multiplying the R4/S3 second to-be-multiplied element values by a, by using the P1 processing elements, to obtain R4/S3 nineteenth intermediate values, and accumulating the R4/S3 nineteenth intermediate values with the R4/S3 eighteenth intermediate values, respectively, to obtain R4/S3 twentieth intermediate values;

step C3, selecting, by the neural network processor, R4/S3 third to-be-multiplied element values from the (2j−1)-th row of input data according to S3, and respectively multiplying the R4/S3 third to-be-multiplied element values by c, by using the P1 processing elements, to obtain R4/S3 twenty-first intermediate values, and accumulating the R4/S3 twenty-first intermediate values with the R4/S3 twentieth intermediate values, respectively, to obtain R4/S3 twenty-second intermediate values;

step C4, selecting, by the neural network processor, R4/S3 fourth to-be-multiplied element values from the (2j)-th row of input data according to S3, and respectively multiplying the R4/S3 fourth to-be-multiplied element values by e, by using the P1 processing elements, to obtain R4/S3 twenty-third intermediate values, and accumulating the R4/S3 twenty-third intermediate values with the R4/S3 twenty-second intermediate values, respectively, to obtain R4/S3 twenty-fourth intermediate values;

step C5, selecting, by the neural network processor, R4/S3 fifth to-be-multiplied element values from the (2j)-th row of input data according to S3, and respectively multiplying the R4/S3 fifth to-be-multiplied element values by d, by using the P1 processing elements, to obtain R4/S3 twenty-fifth intermediate values, and accumulating the R4/S3 twenty-fifth intermediate values with the R4/S3 twenty-fourth intermediate values, respectively, to obtain R4/S3 twenty-sixth intermediate values;

step C6, selecting, by the neural network processor, R4/S3 sixth to-be-multiplied element values from the (2j)-th row of input data according to S3, and respectively multiplying the R4/S3 sixth to-be-multiplied element values by f, by using the P1 processing elements, to obtain R4/S3 twenty-seventh intermediate values, and accumulating the R4/S3 twenty-seventh intermediate values with the R4/S3 twenty-sixth intermediate values, respectively, to obtain R4/S3 twenty-eighth intermediate values;

step C7, selecting, by the neural network processor, R4/S3 seventh to-be-multiplied element values from the (2j+1)-th row of input data according to S3, and respectively multiplying the R4/S3 seventh to-be-multiplied element values by h, by using the P1 processing elements, to obtain R4/S3 twenty-ninth intermediate values, and accumulating the R4/S3 twenty-ninth intermediate values with the R4/S3 twenty-eighth intermediate values, respectively, to obtain R4/S3 thirtieth intermediate values;

step C8, selecting, by the neural network processor, R4/S3 eighth to-be-multiplied element values from the (2j+1)-th row of input data according to S3, and respectively multiplying the R4/S3 eighth to-be-multiplied element values by g, by using the P1 processing elements, to obtain R4/S3 thirty-first intermediate values, and accumulating the R4/S3 thirty-first intermediate values with the R4/S3 thirtieth intermediate values, respectively, to obtain R4/S3 thirty-second intermediate values;

step C9, selecting, by the neural network processor, R4/S3 ninth to-be-multiplied element values from the (2j+1)-th row of input data according to S3, and respectively multiplying the R4/S3 ninth to-be-multiplied element values by i, by using the P1 processing elements, to obtain R4/S3 thirty-third intermediate values, and accumulating the R4/S3 thirty-third intermediate values with the R4/S3 thirty-second intermediate values, respectively, to obtain R4/S3 thirty-fourth intermediate values.

When F isn't three, an implementation that the neural network processor performs convolution calculation on the input data from the (2j−1)-th row to the (2j+1)-th row and the target convolution kernel by using the P1 processing elements, to obtain the j-th row of output data of the output matrix of the network layer A, can be referred to the implementation that, when F is three, the neural network processor performs convolution calculation on the input data from the (2j−1)-th row to the (2j+1)-th row and the target convolution kernel by using the P1 processing elements, to obtain the j-th row of output data of the output matrix of the network layer A, which is not be described herein.

When S1=2, the j-th row of output data of the output matrix of the network layer A is (V1, V2, V3, V4, V5, V6, V7, V8), and when S1=4, the j-th row of output data of the output matrix of the network layer A is (V3, V5, V7).

When S1=2, the j-th row of output data of the output matrix of the network layer A is (V1, V2, V3, V4, V5, V6, V7, V8, V9), and when S1=6, the j-th row of output data of the output matrix of the network layer A is (V1, V4, V7).

For example, referring to FIG. 2H, a block diagram of determining the output matrix of the network layer A in accordance with another embodiment of the present disclosure is shown. Wherein, P1=1, Q=7, R4=13, F=3, S3=2 and i=1, each row of input data from a first row to a third row of the input matrix of the network layer A includes 13 element values. Both 0 and 14 in the first row of input data are padding data, both 16 and 30 in a second row of input data are padding data, and both 32 and 46 in the third row of input data are padding data. Nine element values included in the target convolution kernel is (c, b, a, f, e, d, i, h, g), the neural network processor uses 7 multiply accumulate units to perform convolution calculation on the input data from the first row to the third row of the input matrix of the network layer A, and the target convolution kernel, so as to obtain the first row of output data of the output matrix of the network layer A.

It can be seen that, in this example, the neural network processor performs convolution calculation on the input data from the (2j−1)-th row to the (2j+1)-th row of the input matrix of the network layer A, and the target convolution kernel by using the P1 processing elements, so as to obtain the j-th row of output data of the output matrix of the network layer A, which can help to improve computational efficiency of the neural network processor, since the P1 processing elements are operated in parallel.

An implementation that the neural network processor determines the output matrix of the network layer A according to the [(R3−F)/S4+1] rows of output data and the bias value can be referred to the implementation that the neural network processor determines the output matrix of the network layer A based on the (R1−F+1) rows of output data and the bias value, which is not be described herein.

Step 204, determining, by the neural network processor, a target preset operation corresponding to the target type image, according to a mapping relationship between pre-stored type images and preset operations.

The type images correspond to the preset operations one by one; if the type image is a face image, the preset operation is to obtain character information based on the face image; if the type image is a license plate image, the preset operation is to obtain license plate registration information based on the license plate image.

Step 205, performing the target preset operation according to the plurality of features included in the target type image.

As can be seen that, compared with the conventional art, when the neural network processor performs convolution calculation on the operation matrix and the convolution kernel, according to the input matrix (obtained based on the input image) and the convolution kernel of the network layer every time, the neural network processor needs to select the operation matrix from the input matrix of the network layer according to the convolution step length. In the present disclosure, for different convolution step lengths, since the convolution step length is configured to screen the plurality of rows of input data from the input matrix of network layer A that is required by the convolution calculation (obtained based on the target type image), the neural network processor performs convolution calculation on the plurality of rows of input data and the convolution kernel that are required by the convolution calculation, to obtain the output matrix (representing a plurality of features included in the target type image) of the network layer A, thereby the calculation efficiency of the neural network processor under different convolution step lengths can be improved. Because a time for obtaining the plurality of features included in the target type image is greatly shortened, the target preset operation corresponding to the target type image can be performed more quickly based on the plurality of features included in the target type image, thus, the efficiency of image analysis can be further improved indirectly.

In a possible implementation, the target type image is the face image, the plurality of features included in the target type image is a plurality of face features, and the step of performing the target preset operation according to the output matrix of the network layer A, includes:

determining, by the neural network processor, whether a face feature set formed by the plurality of face features matches with a face feature library;

if the face feature set formed by the plurality of face features matches with a target face feature set, determining, by the neural network processor, target character information corresponding to the target face feature set included in the face feature library, according to a mapping relationship between a pre-stored face feature set and character information; and performing, by the neural network processor, an output operation on the target character information.

The mapping relationship between the face feature set and the character information is pre-stored in the neural network processor, which is shown in the following table 3:

TABLE 3

| Face feature set | Character information |
| --- | --- |
| First face feature set | First character information |
| Second face feature set | Second character information |
| Third face feature set | Third character information |

The face feature sets correspond to the character information one by one; if the face feature set is a first face feature set, then, the character information is a first character information, correspondingly.

It can be seen that, in the example, because the time for obtaining the plurality of face features is greatly shortened, it can be faster to determine the character information corresponding to the face feature set formed by the plurality of face features, and then, efficiency of obtaining the corresponding character information based on face image analysis can be indirectly improved.

In a possible implementation, the target type image is a license plate image, the plurality of features included in the target type image is a target license plate number, and the step of performing the target preset operation according to the output matrix of the network layer A, includes:

determining whether the target license plate number matches with a license plate number library;

if the target license plate number matches with the license plate number library, determining target license plate registration information corresponding to the target license plate number, according to a mapping relationship between pre-stored license plate numbers and vehicle registration information; and performing the output operation on the target license plate registration information.

The mapping relationship between the license plate numbers and the vehicle registration information is pre-stored in the neural network processor, which is shown in the following table 4:

TABLE 4

| License plate number | Vehicle registration information |
| --- | --- |
| First license plate number | First vehicle registration information |
| Second license plate number | Second vehicle registration information |
| Third license plate number | Third vehicle registration information |
| ... | ... |

The license plate numbers correspond to the vehicle registration information one by one; if the license plate number is a first license plate number, then, the vehicle registration information is a first vehicle registration information, correspondingly.

It can be seen that, in the example, because the time for obtaining the license plate number is greatly shortened, it can be faster to determine the vehicle registration information corresponding to the license plate number, and then, efficiency of obtaining the corresponding vehicle registration information based on license plate image analysis can be indirectly improved.

Figure 3:
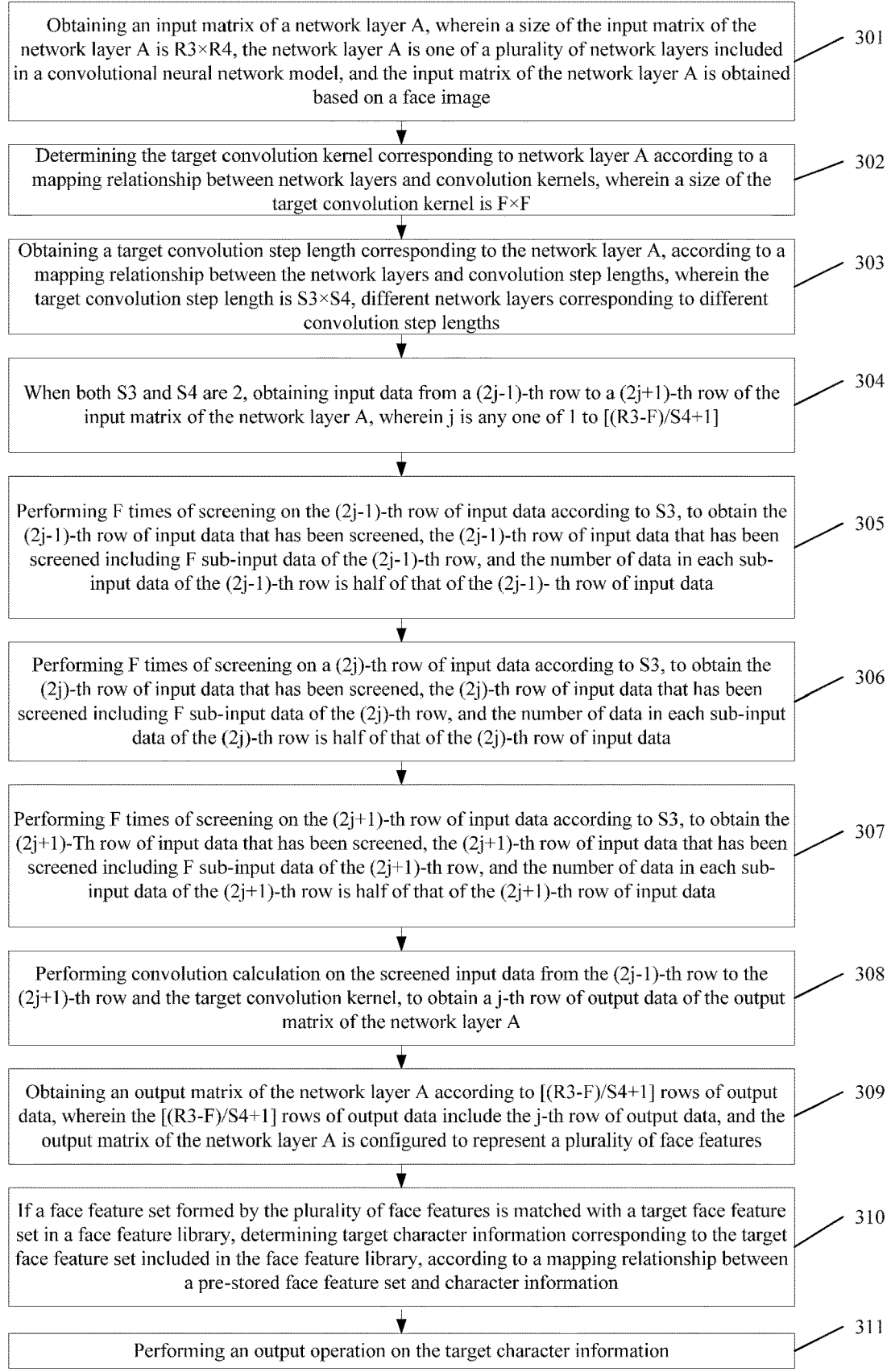
FIG. 3 is a flowchart of an image analysis method based on a convolutional neural network in accordance with another embodiment of the present disclosure.

Consistent with the embodiment shown in FIG. 2A above, referring to FIG. 3, a flowchart of an image analysis method based on the convolutional neural network in accordance with another embodiment of the present disclosure is shown. The image analysis method based on the convolutional neural network is applied to the neural network processor and includes steps 301-311, specifically as follows:

Step 301, obtaining, by the neural network processor, an input matrix of a network layer A, wherein a size of the input matrix of network layer A is R3×R4, the network layer A is one of a plurality of network layers included in a convolutional neural network model, and the input matrix of the network layer A is obtained based on a face image.

Step 302, determining, by the neural network processor, a target convolution kernel corresponding to the network layer A according to a mapping relationship between network layers and convolution kernels, wherein a size of the target convolution kernel is F×F.

Step 303, obtaining, by the neural network processor, a target convolution step length corresponding to the network layer A, according to a mapping relationship between the network layers and convolution step lengths, wherein the target convolution step length is S3×S4, different network layers corresponding to different convolution step lengths.

Step 304, when both S3 and S4 are 2, obtaining, by the neural network processor, input data from a (2j−1)-th row to a (2j+1)-th row of the input matrix of the network layer A, wherein j is any one of 1 to [(R3−F)/S4+1].

Step 305, performing, by the neural network processor, F times of screening on the (2j−1)-th row of input data according to S3, to obtain the (2j−1)-th row of input data that has been screened, the (2j−1)-th row of input data that has been screened including F sub-input data of the (2j−1)-th row, and the number of data in each sub-input data of the (2j−1)-th row is half of that of the (2j−1)-th row of input data.

Step 306, performing, by the neural network processor, F times of screening on a (2j)-th row of input data according to S3, to obtain the (2j)-th row of input data that has been screened, the (2j)-th row of input data that has been screened including F sub-input data of the (2j)-th row, and the number of data in each sub-input data of the (2j)-th row is half of that of the (2j)-th row of input data.

Step 307, performing, by the neural network processor, F times of screening on the (2j+1)-th row of input data according to S3, to obtain the (2j+1)-th row of input data that has been screened, the (2j+1)-th row of input data that has been screened including F sub-input data of the (2j−1)-th row, and the number of data in each sub-input data of the (2j−1)-th row is half of that of the (2j+1)-th row of input data.

Step 308, performing, by the neural network processor, convolution calculation on the screened input data from the (2j−1)-th row to the (2j+1)-th row and the target convolution kernel, to obtain a j-th row of output data of the output matrix of the network layer A.

Step 309, obtaining, by the neural network processor, an output matrix of the network layer A according to [(R3−F)/S4+1] rows of output data, wherein the [(R3−F)/S4+1] rows of output data include the j-th row of output data, and the output matrix of the network layer A is configured to represent a plurality of face features.

Step 310, if a face feature set formed by the plurality of face features matches with a target face feature set in a face feature library, determining, by the neural network processor, target character information corresponding to the target face feature set according to a mapping relationship between a pre-stored face feature set and character information.

Step 311, performing, by the neural network processor, an output operation on the target character information.

It should be noted that a specific implementation process of each step of the method shown in FIG. 3 can be referred to the specific implementation process of the above method, which is not described herein.

Figure 4:
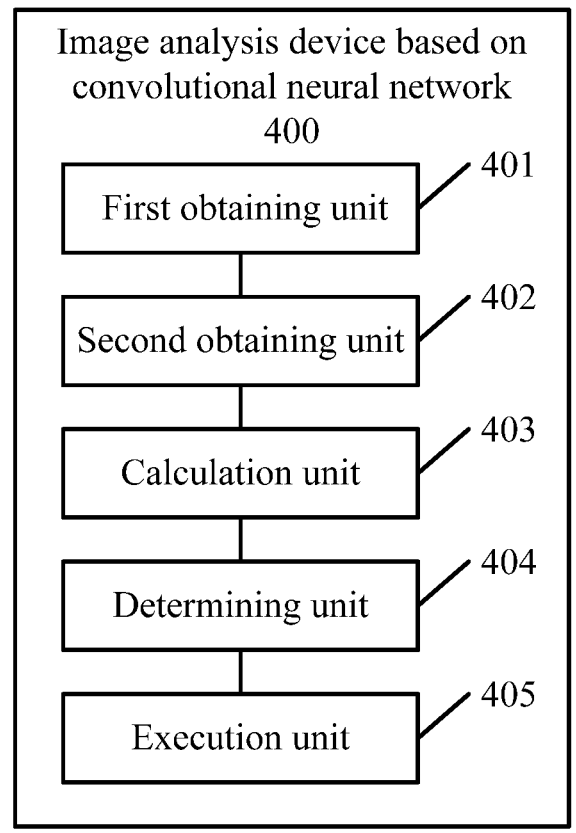
FIG. 4 is a block diagram of functional units of an image analysis device based on a convolutional neural network in accordance with an embodiment of the present disclosure.

Referring to FIG. 4, a block diagram of functional units of an image analysis device based on a convolutional neural network in accordance with an embodiment of the present disclosure is shown. The image analysis device 400 based on the convolutional neural network is applied to a neural network processor and includes:

a first obtaining unit 401 configured to obtain an input matrix of a network layer A, wherein the network layer A is one of a plurality of network layers included in a convolutional neural network model, and the input matrix of the network layer A is obtained based on a target type image;

a second obtaining unit 402 configured to obtain a target convolution kernel and a target convolution step length corresponding to the network layer A, different network layers corresponding to different convolution step lengths;

a calculation unit 403 configured to perform convolution calculation on the input matrix of the network layer A and the target convolution kernel according to the target convolution step length, to obtain an output matrix of the network layer A, wherein the target convolution step length is configured to screen a plurality of rows of input data required by the convolution calculation from the input matrix of the network layer A, and the output matrix of the network layer A is configured to represent a plurality of features included in the target type image;

a determining unit 404 configured to determine a target preset operation corresponding to the target type image, according to a mapping relationship between pre-stored type images and preset operations; and an execution unit 405 configured to perform the target preset operation according to the plurality of features included in the target type image.

As can be seen that, compared with the conventional art, when the neural network processor performs convolution calculation on the operation matrix and the convolution kernel, according to the input matrix (obtained based on the input image) and the convolution kernel of the network layer every time, the neural network processor needs to select the operation matrix from the input matrix of the network layer according to the convolution step length. In the present disclosure, for different convolution step lengths, since the convolution step length is configured to screen the plurality of rows of input data from the input matrix of network layer A that is required by the convolution calculation (obtained based on the target type image), the neural network processor performs convolution calculation on the plurality of rows of input data and the convolution kernel that are required by the convolution calculation, to obtain the output matrix (representing a plurality of features included in the target type image) of the network layer A, thereby the calculation efficiency of the neural network processor under different convolution step lengths can be improved. Because a time for obtaining the plurality of features included in the target type image is greatly shortened, the target preset operation corresponding to the target type image can be performed more quickly based on the plurality of features included in the target type image, thus, the efficiency of image analysis can be further improved indirectly.

In a possible implementation, the target type image is a face image, the plurality of features included in the target type image is a plurality of face features, and in terms of performing the target preset operation according to the output matrix of the network layer A, the execution unit 405 is specifically configured to:

determine whether a face feature set formed by the plurality of face features matches with a face feature library;

if the face feature set formed by the plurality of face features matches with a target face feature set, determine target character information corresponding to the target face feature set included in the face feature library, according to a mapping relationship between a pre-stored face feature set and character information; and perform an output operation on the target character information.

In a possible implementation, the target type image is a license plate image, a plurality of features included in the target type image is a target license plate number, and in terms of performing the target preset operation according to the output matrix of the network layer A, the execution unit 405 is specifically configured to:

determine whether the target license plate number matches with a license plate number library;

if the target license plate number matches with the license plate number library, determine target license plate registration information corresponding to the target license plate number, according to a mapping relationship between pre-stored license plate numbers and vehicle registration information; and perform the output operation on the target license plate registration information.

In a possible implementation, in terms of obtaining the target convolution kernel and the target convolution step length corresponding to the network layer A, the second obtaining unit 402 is specifically configured to:

obtain the target convolution kernel corresponding to the network layer A, according to a mapping relationship between network layers and convolution kernels; and obtain the target convolution step length corresponding to the network layer A, according to a mapping relationship between the network layers and convolution step lengths.

In a possible implementation, the target convolution step length is S1×S2, a size of the input matrix of the network layer A is R1×R2, a size of the target convolution kernel is F×F, and in terms of performing convolution calculation on the input matrix of the network layer A and the target convolution kernel according to the target convolution step length, to obtain the output matrix of the network layer A, the calculation unit 403 is specifically configured to:

when both S1 and S2 are 1, obtain input data from an i-th row to a (i+F−1)-th row of the input matrix of the network layer A, wherein i is any one of 1 to (R1−F+1);

perform convolution calculation on the input data from the i-th row to the (i+F−1)-th row and the target convolution kernel, to obtain the i-th row of output data of the output matrix of the network layer A; and obtain the output matrix of the network layer A, according to (R1−F+1) rows of output data, the (R1−F+1) rows of output data including the i-th row of output data.

In a possible implementation, the target convolution step length is S3×S4, the size of the input matrix of the network layer A is R3×R4, the size of the target convolution kernel is F×F, and in terms of performing convolution calculation on the input matrix of the network layer A and the target convolution kernel according to the target convolution step length, to obtain the output matrix of the network layer A, the calculation unit 403 is specifically configured to:

when both S1 and S2 are 2, obtain input data from a (2j−1)-th row to a (2j+1)-th row of the input matrix of the network layer A, wherein j is any one of 1 to [(R3−F)/S4+1];

screen the input data from the (2j−1)-th row to the (2j+1)-th row according to the target convolution step length, to obtain the input data from the (2j−1)-th row to the (2j+1)-th row that has been screened;

perform convolution calculation on the input data from the (2j−1)-th row to the (2j+1)-th row that has been screened, and the target convolution kernel, to obtain a j-th row of output data of the output matrix of the network layer A; and obtain the output matrix of the network layer A according to [(R3−F)/S4+1] rows of output data, the [(R3−F)/S4+1] rows of output data including the j-th row of output data.

In a possible implementation, in terms of screening the input data from the (2j−1)-th row to the (2j+1)-th row according to the target convolution step length, to obtain the input data from the (2j−1)-th row to the (2j+1)-th row that has been screened, the calculation unit 403 is specifically configured to:

perform F times of screening on the (2j−1)-th row of input data according to S3, to obtain the (2j−1)-th row of input data that has been screened, the (2j−1)-th row of input data that has been screened including F sub-input data of the (2j−1)-th row, and the number of data in each sub-input data of the (2j−1)-th row is half of that of the (2j−1)-th row of input data;

perform F times of screening on a (2j)-th row of input data according to S3, to obtain the (2j)-th row of input data that has been screened, the (2j)-th row of input data that has been screened including F sub-input data of the (2j)-th row, and the number of data in each sub-input data of the (2j)-th row is half of that of the (2j)-th row of input data; and perform F times of screening on the (2j+1)-th row of input data according to S3, to obtain the (2j+1)-th row of input data that has been screened, the (2j+1)-th row of input data that has been screened including F sub-input data of the (2j−1)-th row, and the number of data in each sub-input data of the (2j−1)-th row is half of that of the (2j+1)-th row of input data.

Figure 5:
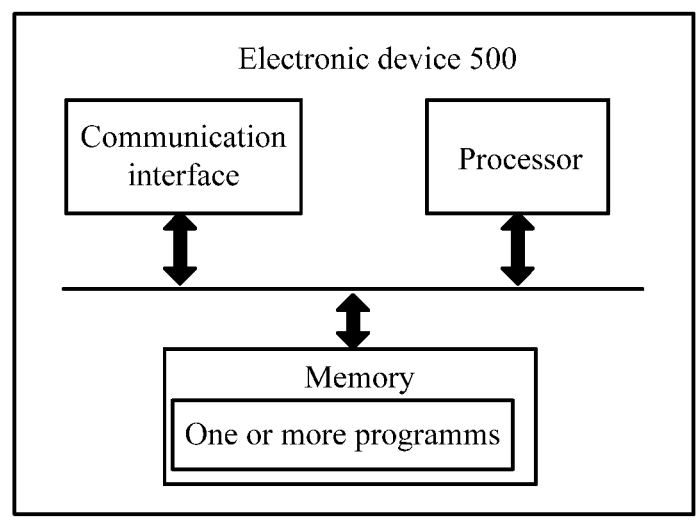
FIG. 5 is a block diagram of an electronic device in accordance with an embodiment of the present disclosure.

Consistent with the embodiment shown in FIG. 2A and FIG. 3 above, referring to FIG. 5, a block diagram of an electronic device in accordance with an embodiment of the present disclosure is shown. The electronic device 500 includes a processor, a memory, a communication interface, and one or more programs stored in the memory and performed by the processor, the one or more programs including instructions for performing the following steps:

obtaining an input matrix of a network layer A, wherein the network layer A is one of a plurality of network layers included in a convolutional neural network model, and the input matrix of the network layer A is obtained based on a target type image;

obtaining a target convolution kernel and a target convolution step length corresponding to the network layer A, different network layers corresponding to different convolution step lengths;

performing convolution calculation on the input matrix of the network layer A and the target convolution kernel according to the target convolution step length, to obtain an output matrix of the network layer A, wherein the target convolution step length is configured to screen a plurality of rows of input data required by the convolution calculation from the input matrix of the network layer A, and the output matrix of the network layer A is configured to represent a plurality of features included in the target type image;

determining a target preset operation corresponding to the target type image according to a mapping relationship between pre-stored type images and preset operations; and performing the target preset operation according to the plurality of features included in the target type image.

As can be seen that, compared with the conventional art, when the neural network processor performs convolution calculation on the operation matrix and the convolution kernel, according to the input matrix (obtained based on the input image) and the convolution kernel of the network layer every time, the neural network processor needs to select the operation matrix from the input matrix of the network layer according to the convolution step length. In the present disclosure, for different convolution step lengths, since the convolution step length is configured to screen the plurality of rows of input data from the input matrix of network layer A that is required by the convolution calculation (obtained based on the target type image), the neural network processor performs convolution calculation on the plurality of rows of input data and the convolution kernel that are required by the convolution calculation, to obtain the output matrix (representing a plurality of features included in the target type image) of the network layer A, thereby the calculation efficiency of the neural network processor under different convolution step lengths can be improved. Because a time for obtaining the plurality of features included in the target type image is greatly shortened, the target preset operation corresponding to the target type image can be performed more quickly based on the plurality of features included in the target type image, thus, the efficiency of image analysis can be further improved indirectly.

In a possible implementation, the target type image is a face image, the plurality of features included in the target type image is a plurality of face features, and in terms of performing the target preset operation according to the output matrix of the network layer A, the programs include the instructions specifically configured to perform the following steps:

determining whether a face feature set formed by the plurality of face features matches with a face feature library;

if the face feature set formed by the plurality of face features matches with a target face feature set, determining target character information corresponding to the target face feature set included in the face feature library, according to a mapping relationship between a pre-stored face feature set and character information; and performing an output operation on the target character information.

In a possible implementation, the target type image is a license plate image, a plurality of features included in the target type image is a target license plate number, and in terms of performing the target preset operation according to the output matrix of the network layer A, the programs include the instructions specifically configured to perform the following steps:

determining whether the target license plate number matches with a license plate number library;

if the target license plate number matches with the license plate number library, determining target license plate registration information corresponding to the target license plate number, according to a mapping relationship between pre-stored license plate numbers and vehicle registration information; and performing the output operation on the target license plate registration information.

In a possible implementation, in terms of obtaining of the target convolution kernel and the target convolution step length corresponding to the network layer A, the programs include the instructions specifically configured to perform the following steps:

obtaining the target convolution kernel corresponding to the network layer A, according to a mapping relationship between network layers and convolution kernels; and obtaining the target convolution step length corresponding to the network layer A, according to a mapping relationship between the network layers and convolution step lengths.

In a possible implementation, the target convolution step length is S1×S2, a size of the input matrix of the network layer A is R1×R2, a size of the target convolution kernel is F×F, and in terms of performing convolution calculation on the input matrix of the network layer A and the target convolution kernel according to the target convolution step length, to obtain the output matrix of the network layer A, the programs include the instructions specifically configured to perform the following steps:

when both S1 and S2 are 1, obtaining input data from an i-th row to a (i+F−1)-th row of the input matrix of the network layer A, wherein i is any one of 1 to (R1−F+1);

performing convolution calculation on the input data from the i-th row to the (i+F−1)-th row and the target convolution kernel to obtain the i-th row of output data of the output matrix of the network layer A; and obtaining the output matrix of the network layer A, according to (R1−F+1) rows of output data, the (R1−F+1) rows of output data including the i-th row of output data.

In a possible implementation, the target convolution step length is S3×S4, the size of the input matrix of the network layer A is R3×R4, the size of the target convolution kernel is F×F, and in terms of performing convolution calculation on the input matrix of the network layer A and the target convolution kernel according to the target convolution step length, to obtain the output matrix of the network layer A, the programs include the instructions specifically configured to perform the following steps:

when both S1 and S2 are 2, obtaining input data from a (2j−1)-th row to a (2j+1)-th row of the input matrix of the network layer A, wherein j is any one of 1 to [(R3−F)/S4+1];

screening the input data from the (2j−1)-th row to the (2j+1)-th row according to the target convolution step length, to obtain the input data from the (2j−1)-th row to the (2j+1)-th row that has been screened;

performing convolution calculation on the input data from the (2j−1)-th row to the (2j+1)-th row that has been screened and the target convolution kernel, to obtain a j-th row of output data of the output matrix of the network layer A; and obtaining the output matrix of the network layer A according to [(R3−F)/S4+1] rows of output data, the [(R3−F)/S4+1] rows of output data comprising the j-th row of output data.

In a possible implementation, in terms of screening the input data from the (2j−1)-th row to the (2j+1)-th row according to the target convolution step length, to obtain the input data from the (2j−1)-th row to the (2j+1)-th row that has been screened, the programs include the instructions specifically configured to perform the following steps:

performing F times of screening on the (2j−1)-th row of input data according to S3, to obtain the (2j−1)-th row of input data that has been screened, the (2j−1)-th row of input data that has been screened including F sub-input data of the (2j−1)-th row, and the number of data in each sub-input data of the (2j−1)-th row is half of that of the (2j−1)-th row of input data;

performing F times of screening on a (2j)-th row of input data according to S3, to obtain the (2j)-th row of input data that has been screened, the (2j)-th row of input data that has been screened including F sub-input data of the (2j)-th row, and the number of data in each sub-input data of the (2j)-th row is half of that of the (2j)-th row of input data; and performing F times of screening on the (2j+1)-th row of input data according to S3, to obtain the (2j+1)-th row of input data that has been screened, the (2j+1)-th row of input data that has been screened including F sub-input data of the (2j−1)-th row, and the number of data in each sub-input data of the (2j−1)-th row is half of that of the (2j+1)-th row of input data.

A neural network processor according to an embodiment of the present disclosure is configured to implement some or all steps of any method which is described in embodiments of the present disclosure.

A neural network processor according to an embodiment of the present disclosure includes any convolution calculation device which is described in embodiments of the present disclosure.

A computer readable storage medium according to an embodiment of the present disclosure is provided. The computer readable storage medium is configured to store computer programs performed by a computer to implement some or all steps of any method which is described in embodiments of the present disclosure. The computer includes an electronic device.

A computer program product according to an embodiment of the present disclosure includes a non-transient computer readable storage medium. The non-transient computer readable storage medium is configured to store computer programs performed by a computer to implement some or all steps of any method which is described in embodiments of the present disclosure. The computer program product can be a software installation package, and the computer includes an electronic device.

It should be noted that, for the sake of simple description, each embodiment of the above method is expressed as a series of action combinations, however, for one of ordinary skill in the related art, the present disclosure can't be restricted by its sequence of the description, as some steps can be simultaneously performed or in other orders according to the present disclosure. Furthermore, it can be understood, for one of ordinary skill in the related art, that embodiments or examples in the description is alternative embodiments or examples, and actions and modules involved are not necessarily required for the present disclosure.

In the above embodiments, the description of each embodiment has its own emphasis, and parts without detailed description in one embodiment can be referred to relevant description of other embodiments.

What is claimed is:

1. A convolution calculation method based on a convolutional neural network applied to a neural network processor and comprising:

obtaining an input matrix of a network layer A, wherein the network layer A is one of a plurality of network layers comprised in a convolutional neural network model, and the input matrix of the network layer A is obtained based on a target type image;

obtaining a target convolution kernel and a target convolution step length corresponding to the network layer A, different network layers corresponding to different convolution step lengths;

performing convolution calculation on the input matrix of the network layer A and the target convolution kernel according to the target convolution step length, to obtain an output matrix of the network layer A, wherein the target convolution step length is configured to screen a plurality of rows of input data required by the convolution calculation from the input matrix of the network layer A, and the output matrix of the network layer A is configured to represent a plurality of features comprised in the target type image;

determining a target preset operation corresponding to the target type image according to a mapping relationship between pre-stored type images and preset operations; and performing the target preset operation according to the plurality of features comprised in the target type image, wherein the target convolution step length is S3×S4, a size of the input matrix of the network layer A is R3×R4, a size of the target convolution kernel is F×F, and the step of performing convolution calculation on the input matrix of the network layer A and the target convolution kernel according to the target convolution step length, to obtain the output matrix of the network layer A, comprises:

when both both S3 and S4 are 2, obtaining input data from a (2j−1)-th row to a (2j+1)-th row of the input matrix of the network layer A, wherein j is any one of 1 to [(R3−F)/S4+1];

screening the input data from the (2j−1)-th row to the (2j+1)-th row according to the target convolution step length, to obtain the input data from the (2j−1)-th row to the (2j+1)-th row that has been screened;

performing convolution calculation on the input data from the (2j−1)-th row to the (2j+1)-th row that has been screened and the target convolution kernel, to obtain a j-th row of output data of the output matrix of the network layer A; and obtaining the output matrix of the network layer A according to [(R3−F)/S4+1] rows of output data, the [(R3−F)/S4+1] rows of output data comprising the j-th row of output data.

2. The method as claimed in claim 1, wherein the target type image is a face image, the plurality of features comprised in the target type image is a plurality of face features, and the step of performing the target preset operation according to the output matrix of the network layer A, comprises:

determining whether a face feature set formed by the plurality of face features matches with a face feature library;

if the face feature set formed by the plurality of face features matches with a target face feature set, determining target character information corresponding to the target face feature set comprised in the face feature library, according to a mapping relationship between a pre-stored face feature set and character information; and performing an output operation on the target character information.

3. The method as claimed in claim 2, wherein the step of obtaining the target convolution kernel and the target convolution step length corresponding to the network layer A, comprises:

obtaining the target convolution kernel corresponding to the network layer A, according to a mapping relationship between network layers and convolution kernels; and obtaining the target convolution step length corresponding to the network layer A, according to a mapping relationship between the network layers and the convolution step lengths.

4. The method as claimed in claim 1, wherein the target type image is a license plate image, a plurality of features comprised in the target type image is a target license plate number, and the step of performing the target preset operation according to the output matrix of the network layer A, comprises:

determining whether the target license plate number matches with a license plate number library;

if the target license plate number matches with the license plate number library, determining target license plate registration information corresponding to the target license plate number, according to a mapping relationship between pre-stored license plate numbers and vehicle registration information; and performing the output operation on the target license plate registration information.

5. The method as claimed in claim 1, wherein the step of screening the input data from the (2j−1)-th row to the (2j+1)-th row according to the target convolution step length, to obtain the input data from the (2j−1)-th row to the (2j+1)-th row that has been screened, comprises:

performing F times of screening on the (2j−1)-th row of input data according to S3, to obtain the (2j−1)-th row of input data that has been screened, the (2j−1)-th row of input data that has been screened comprising F sub-input data of the (2j−1)-th row, and the number of data in each sub-input data of the (2j−1)-th row being half of that of the (2j−1)-th row of input data;

performing F times of screening on a (2j)-th row of input data according to S3, to obtain the (2j)-th row of input data that has been screened, the (2j)-th row of input data that has been screened comprising F sub-input data of the (2j)-th row, and the number of data in each sub-input data of the (2j)-th row being half of that of the (2j)-th row of input data; and performing F times of screening on the (2j+1)-th row of input data according to S3, to obtain the (2j+1)-th row of input data that has been screened, the (2j+1)-th row of input data that has been screened including F sub-input data of the (2j−1)-th row, and the number of data in each sub-input data of the (2j−1)-th row being half of that of the (2j+1)-th row of input data.

6. A neural network processor configured to implement some or all steps of an image analysis method based on a convolutional neural network applied to the neural network processor and comprising:

obtaining an input matrix of a network layer A, wherein the network layer A is one of a plurality of network layers comprised in a convolutional neural network model, and the input matrix of the network layer A is obtained based on a target type image;

obtaining a target convolution kernel and a target convolution step length corresponding to the network layer A, different network layers corresponding to different convolution step lengths;

performing convolution calculation on the input matrix of the network layer A and the target convolution kernel according to the target convolution step length, to obtain an output matrix of the network layer A, wherein the target convolution step length is configured to screen a plurality of rows of input data required by the convolution calculation from the input matrix of the network layer A, and the output matrix of the network layer A is configured to represent a plurality of features comprised in the target type image;

determining a target preset operation corresponding to the target type image according to a mapping relationship between pre-stored type images and preset operations; and performing the target preset operation according to the plurality of features comprised in the target type image, wherein the target convolution step length is $S3 \times S4$, a size of the input matrix of the network layer A is $R3 \times R4$, a size of the target convolution kernel is $F \times F$, and the step of performing convolution calculation on the input matrix of the network layer A and the target convolution kernel according to the target convolution step length, to obtain the output matrix of the network layer A, comprises:

when both both S3 and S4 are 2, obtaining input data from a $(2j-1)$-th row to a $(2j+1)$-th row of the input matrix of the network layer A, wherein j is any one of 1 to $[(R3-F)/S4+1]$;

screening the input data from the $(2j-1)$-th row to the $(2j+1)$-th row according to the target convolution step length, to obtain the input data from the $(2j-1)$-th row to the $(2j+1)$-th row that has been screened;

performing convolution calculation on the input data from the $(2j-1)$-th row to the $(2j+1)$-th row that has been screened and the target convolution kernel, to obtain a j-th row of output data of the output matrix of the network layer A; and obtaining the output matrix of the network layer A according to $[(R3-F)/S4+1]$ rows of output data, the $[(R3-F)/S4+1]$ rows of output data comprising the j-th row of output data.

* * * * *